(12) United States Patent
Bandai et al.

(10) Patent No.: US 6,768,741 B1
(45) Date of Patent: Jul. 27, 2004

(54) ATM SWITCH

(75) Inventors: Ryouichi Bandai, Yokohama (JP);
Masahiko Motoyama, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/559,724

(22) Filed: Apr. 28, 2000

(30) Foreign Application Priority Data

Apr. 30, 1999 (JP) .......................................... 11-124935

(51) Int. Cl.$^7$ ............................................ H04L 12/28
(52) U.S. Cl. ........................ 370/397; 370/399; 370/465
(58) Field of Search ............................... 370/229–230, 370/252, 395.1, 397, 399, 392, 395.21, 395.6, 409, 465, 466, 467, 230.1–235

(56) References Cited

U.S. PATENT DOCUMENTS

| | | | |
|---|---|---|---|
| 5,414,703 A | | 5/1995 | Sakaue et al. |
| 5,467,349 A | * | 11/1995 | Huey et al. .................. 370/397 |
| 5,581,545 A | * | 12/1996 | Moritomo ................ 370/395.1 |
| 5,610,913 A | * | 3/1997 | Tomonaga et al. .......... 370/399 |
| 6,091,708 A | * | 7/2000 | Matsunuma ............... 370/397 |
| 6,147,972 A | * | 11/2000 | Onishi et al. .......... 370/395.21 |
| 6,289,014 B1 | * | 9/2001 | Hoshino et al. ............ 370/392 |
| 6,483,810 B1 | * | 11/2002 | Ono et al. ................ 370/395.6 |

* cited by examiner

Primary Examiner—Duc Ho
Assistant Examiner—Phuongchau Ba Nguyen
(74) Attorney, Agent, or Firm—Finnegan, Henderson, Farabow, Garrett & Dunner, L.L.P.

(57) ABSTRACT

There is provided a compact ATM switch. Each of the bit values of at least one of counters for counting the number of ATM cells in a cell buffer is set to be "H" when the at least one of counters is preset.

16 Claims, 5 Drawing Sheets

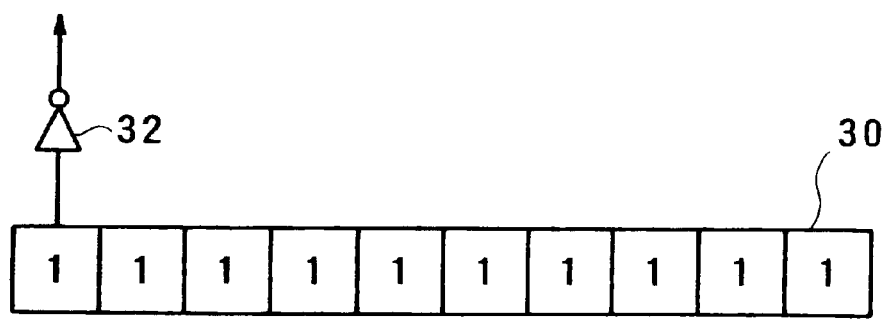
F I G. 4

ATM SWITCH

BACKGROUND OF THE INVENTION

1. Field of the Invention

The present invention relates generally to an asynchronous transfer mode (ATM) switch.

2. Description of the Related Art

Generally in order to allow an ATM switch having a cell buffer to carry out a traffic control, e.g., a discard preference control function, a cell statistical information processing is carried out, and it is required to provide a cell counter for managing the number of cells stored in the buffer. Also in order to enable a contention control to realize fair transmission lines, generally in order to enable a flow control function, the cell statistical information processing is carried out, and the cell counter is used similar to the discard preference control function.

The traffic control must be carried out every output link, on which control traffic, such as the call/acceptance control (CAC) or congestion avoidance, may concentrate, so that the cell counter is provided in each of output links and each of classes. Therefore, the number of cell counters is large. This can not be avoided.

In order to generate flow control signals, the cell counter manages a threshold, so that the cell counter is provided with a threshold register. Since this threshold register sets the quality of service (QOS) and the cell discard preference (CLP) every output port, a large number of registers are provided. This can also be avoided.

In order to carry out the traffic control, the large number of cell counters themselves must frequently detect whether cells exist.

Conventionally, the cell counter is designed to be "L", i.e., "0", when it is reset.

Therefore, in conventional ATM switches a decoder 45 for detecting whether the bit value of all of corresponding cell counters 40 is "0" as shown in FIG. 6 must be provided in order to detect whether an ATM cell exists in each of cell buffers, so that there is a problem in that the ATM switch is large.

SUMMARY OF THE INVENTION

It is therefore an object of the present invention to eliminate the aforementioned problems and to provide a compact ATM switch.

In order to accomplish the aforementioned and other objects, according to one aspect of the present invention, an ATM switch comprises: a plurality of input line corresponding parts, each of which is provided in a corresponding one of input transmission lines, to which ATM cells are transmitted, each of the input line corresponding parts having a used quantity parameter control unit for monitoring the flow rate of the ATM cells, and a header converting part for converting VPI (Virtual Path Identifier) and VCI of a header of each of the ATM cells which have passed through the used quantity parameter control unit; a switch element having an input port part, which has a plurality of input ports, each of which corresponds to a corresponding one of the input line corresponding parts, and which receives the ATM cells transmitted from the input line corresponding parts via a corresponding one of the input ports, an output port part having a plurality of output ports, a self-routing switch for outputting the ATM cells, which are received via the input ports, from one of the output ports corresponding to the VPI and VCI of the header of each of the ATM cells, a first cell buffer for temporarily storing the ATM cells, and a first counter for counting the number of the ATM cells in the first cell buffer; and a plurality of output line corresponding parts provided so as to correspond to the output ports, each of the output line corresponding parts having a second cell buffer for temporarily storing the ATM cells transmitted from a corresponding one of the output ports and for outputting the ATM cells to a corresponding one of output transmission lines, and a second counter for counting the number of the ATM cells in the second cell buffer, wherein the used quantity parameter control unit has a third cell buffer for temporarily storing the ATM cells, and a third counter for counting the number of the ATM cells in the third cell buffer, and wherein each of bit values of at least one of the first through third counters is set to be "H" when the at least one of the first through third counters is preset.

The ATM switch may further comprise a decoder for determining whether the ATM cells exist in a corresponding one of the cell buffers, on the basis of the most significant value of the at least one of the first through third counters, each of the bit values of which is set to be "H" when the at least one of the first through third counters is preset.

The ATM switch may further comprise a control circuit for controlling the readout of the ATM cells from the second and third cell buffers.

The first cell buffer may be provided in the front stage of the self-routing switch so as to correspond to each of the input ports.

The first cell buffer may be provided in the subsequent stage of the self-routing switch so as to correspond to each of the output ports, and the first counter may be provided so as to correspond to each of the cell buffers.

The first cell buffer may be provided at each of cross points in the self-routing switch, and the first counter may be provided so as to correspond to each of the cell buffers.

The first cell buffer may be a common buffer.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 4 is a schematic diagram showing a reset state of a counter for use in an ATM switch according to the present invention;

DESCRIPTION OF THE PREFERRED EMBODIMENTS

Referring now to the accompanying drawings, particularly to FIGS. 1 through 5, a preferred embodiment of an ATM switch according to the present invention will be described below.

Figure 1:
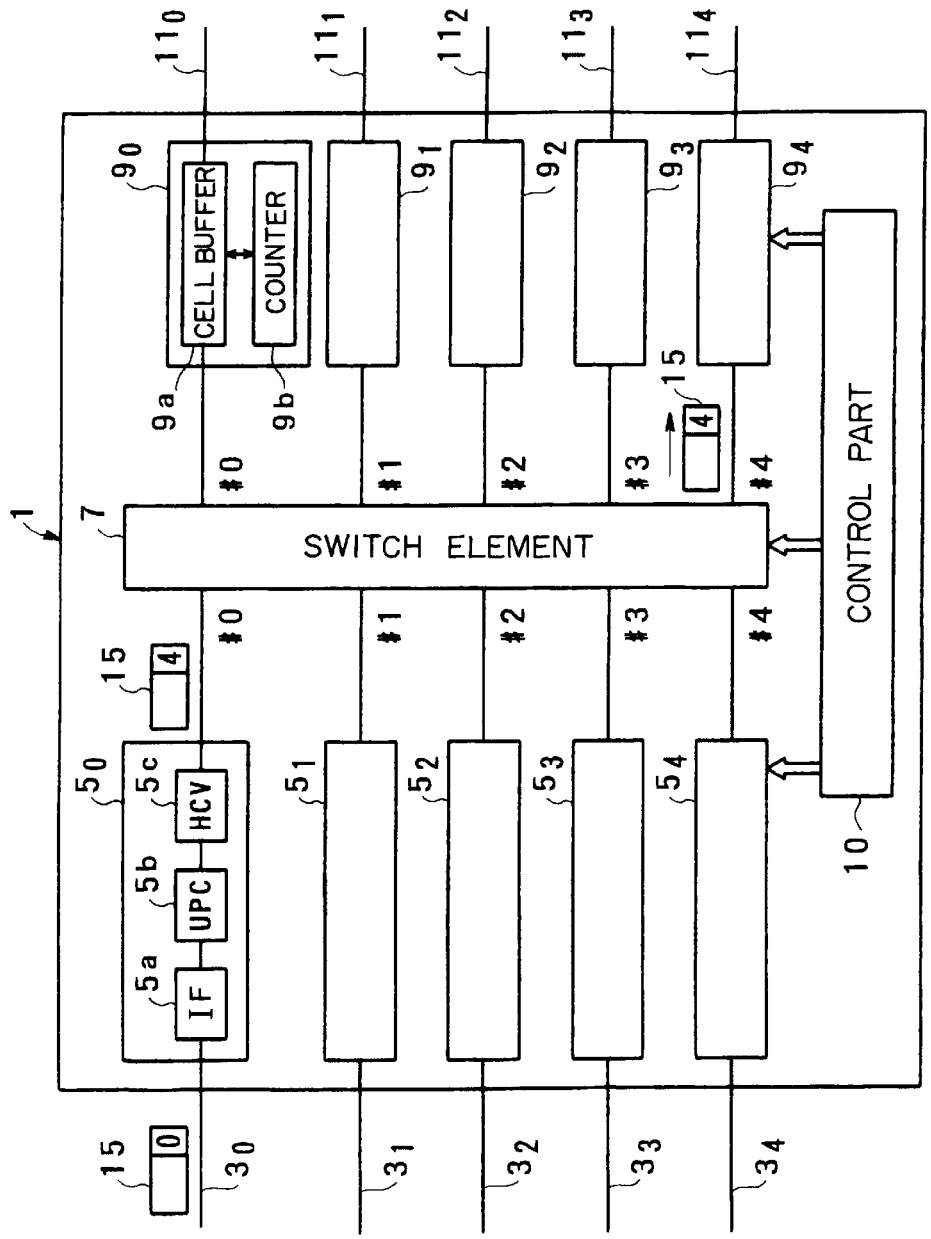
FIG. 1 is a block diagram of a preferred embodiment of an ATM switch according to the present invention.

FIG. 1 shows the construction of an ATM switch in this preferred embodiment. This ATM switch comprises a plurality of input line corresponding parts $5_0, \ldots 5_4$, a switch element 7, and a plurality of output line corresponding parts $9_0, \ldots 9_4$, and a control part 10.

The input line corresponding parts $5_i$ (i=0, ..., 4) are provided so as to correspond to input transmission lines $3_i$, and the output line corresponding lines $9_i$ (i=0, ..., 4) are provided so as to correspond to output transmission lines $11_i$.

Each of the input line corresponding parts $5_i$ (i=0, ..., 4) is provided so as to correspond to a corresponding one of input transmission lines $3_i$, and each of the output line corresponding lines $9_i$ (i=0, ..., 4) is provided so as to correspond to a corresponding one of output transmission lines $11_i$.

Figure 2:
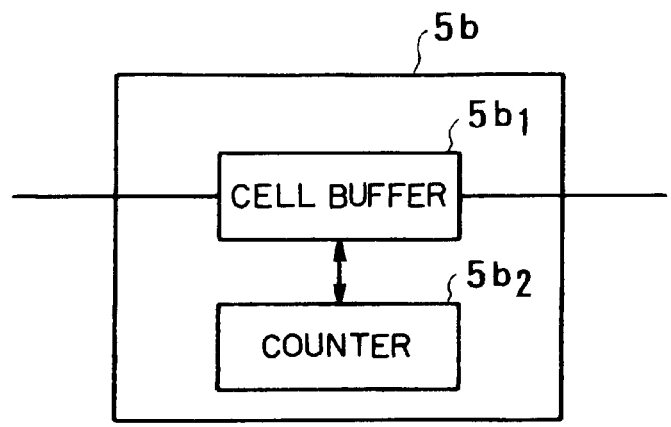
FIG. 2 is a block diagram of a used quantity parameter control unit of an ATM switch according to the present invention.

Each of the input line corresponding parts $5_i$ (i=0, ..., 4) comprises an interface 5a, a used quantity parameter control unit (which will be also hereinafter referred to as a "UPC") 5b, and a header converting part 5c. ATM cells 15 transmitted via the input lines $3_i$ (i=0, ..., 4) are first inputted to the interface 5a of the input line corresponding part $5_i$ corresponding to the input transmission line $3_i$, and then, transmitted to the UPC 5b. The UPC 5b monitors the flow rate of the ATM cells 15. The UPC 5b has a cell buffer $5b_1$ and a counter $5b_2$ as shown in FIG. 2. The ATM cells 15 transmitted to the UPC 5b are temporarily stored in the cell buffer $5b_1$, and then, transmitted to the header converting part 5c. Then, the number of ATM cells 15 in the cell buffer $5b_1$ is counted by the counter $5b_2$.

The virtual channel identifier (which will be also hereinafter referred to as a "VCI") of the ATM cell 15 used on the input transmission line is converted by the header converting part 5c into a VCI used on the switch element 7 and output transmission line. For example, the VCI of the ATM cell 15 10 inputted to the input line corresponding line $5_0$ is changed from "0" to "4". The header converting part 5c is controlled by a control part 10.

Figure 3:
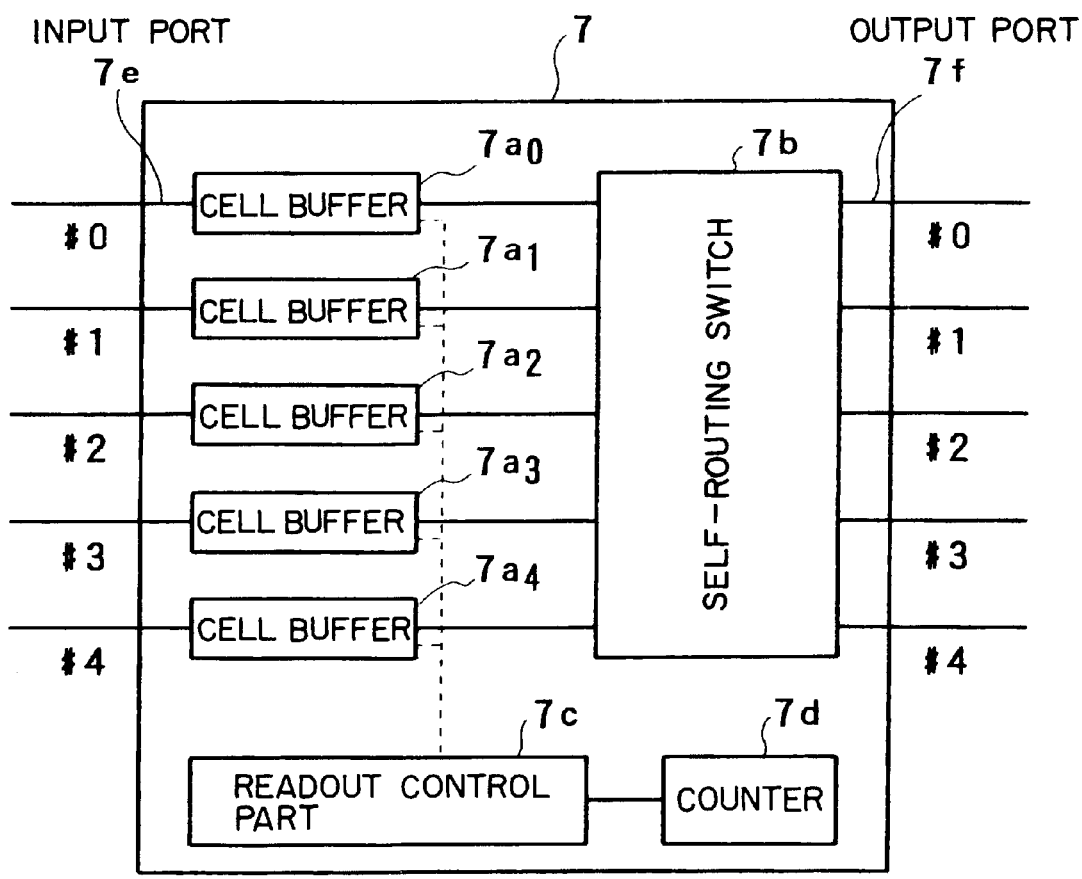
FIG. 3 is a block diagram of a switch element of an ATM switch according to the present invention.
Figure 5:
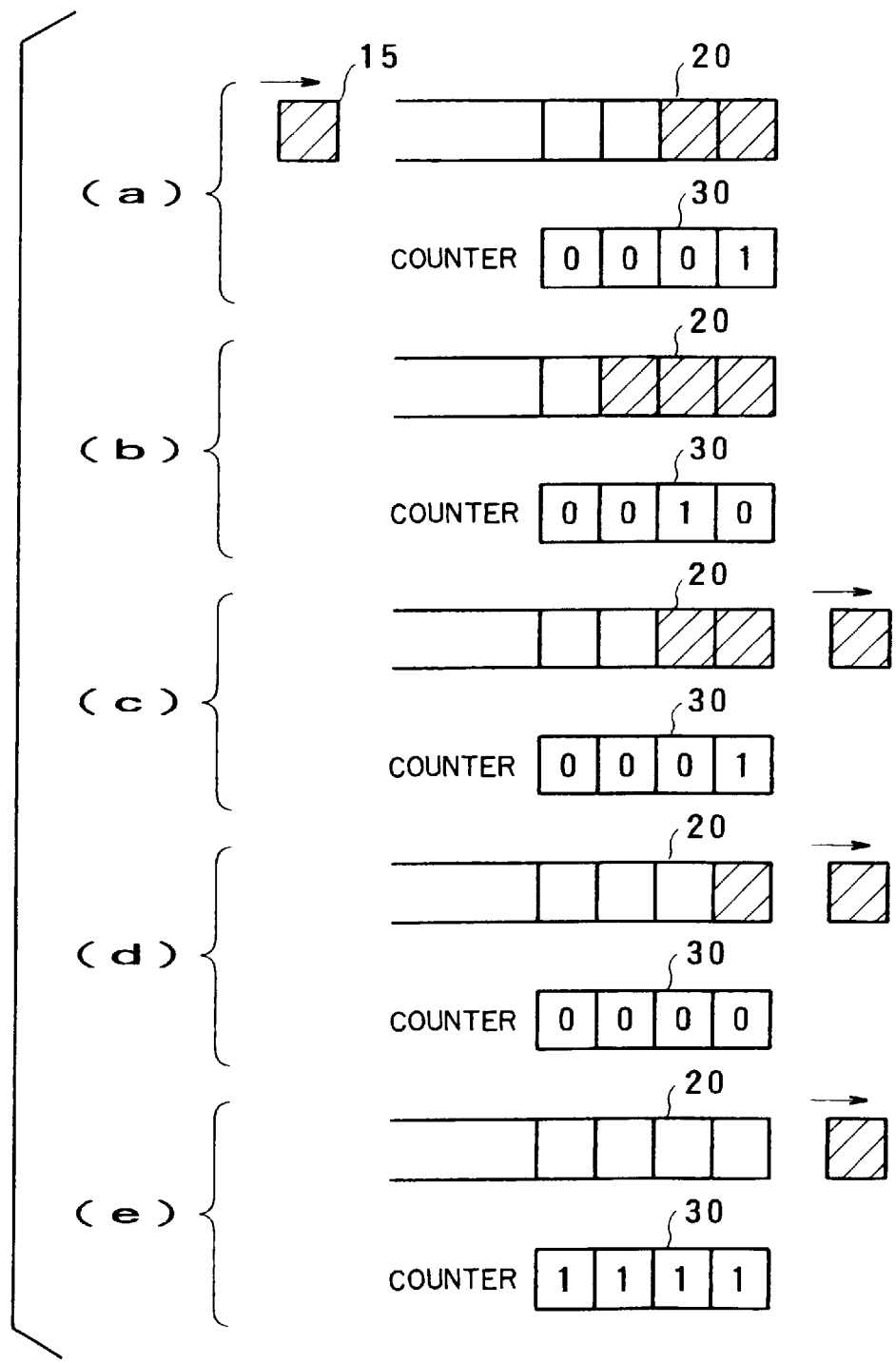
FIG. 5 is a schematic diagram for explaining the operation of the counter of FIG. 4.
Figure 6:
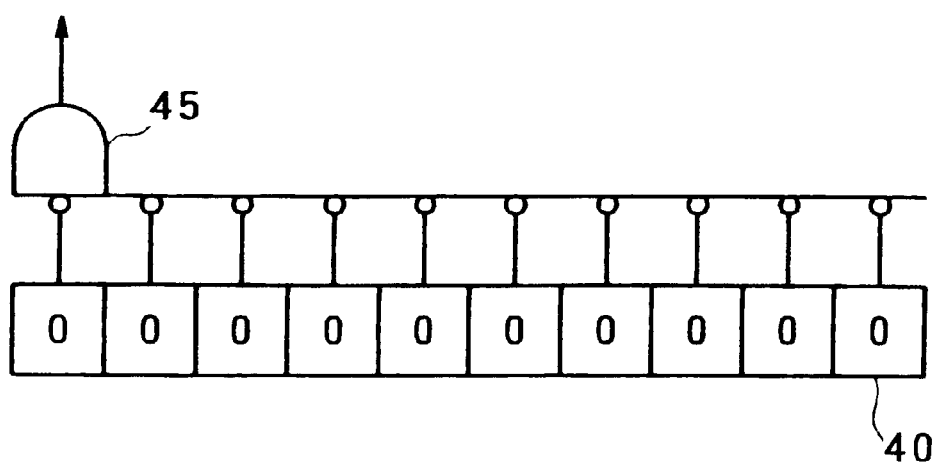
FIG. 6 is a schematic diagram showing a reset state of a counter for use in a conventional ATM switch.

As shown in FIG. 3, the switch element 7 comprises a plurality of cell buffers $7a_0, \ldots, 7a_4$, a self-routing switch 7b, a readout control part 7c, a counter 7d, an input port part 7e and an output port part 7f. The input port part 7e has a plurality of input ports #0 through #4, the number of which corresponds to the number of the input line corresponding parts $5_0, \ldots, 5_4$. The output port part 7f has a plurality of output ports #0 through #4, the number of which corresponds to the number of the output line corresponding parts $9_0, \ldots, 9_4$.

The input port #0 is connected to the output end of the input line corresponding part $5_0$ and to the input end of the cell buffer $7a_0$. The input port #1 is connected to the output end of the input line corresponding part $5_1$ and to the input end of the cell buffer $7a_1$. The input port #2 is connected to the output end of the input line corresponding part $5_2$ and to the input end of the cell buffer $7a_2$. The input port #3 is connected to the output end of the input line corresponding part $5_3$ and to the input end of the cell buffer $7a_3$. The input port #4 is connected to the output end of the input line corresponding part $5_4$ and to the input end of the cell buffer $7a_4$.

The ATM cells 15 transmitted from the input line corresponding part $5_i$ (i=0, ..., 4) are inputted, via the corresponding input port #1, to the cell buffer $7a_1$ of the switch element 7 to be temporarily stored therein. The readout of the ATM cells 15 from each of the cell buffers $7a_i$ (i=0, ..., 4) is controlled by the readout control part 7c. The number of the ATM cells 15 stored in each of the cell buffers $7a_i$ (i=0, ..., 4) is counted by the counter 7d. Furthermore, the counter 7d is provided so as to correspond to each of the cell buffers $7a_i$ (i=0, ..., 4) although only one counter 7d is shown in FIG. 3.

The ATM cells 15 read out from the cell buffers $7a_i$ (i=0, ..., 4) are transmitted to the self-routing switch 7b, and outputted from output ports corresponding to the value of the VCI converted by the header converting part 5c. For example, in FIG. 1, the VCI of the ATM cell 15 is converted from "0" to "4" by the header converting part 5c. Then, the ATM cell 15 having the VCI converted to "4" is transmitted, via the input port #0 of the switch element 7 to the cell buffer $7a_0$ to be stored therein. Then, the ATM cell 15 read out from the cell buffer $7a_0$ is transmitted to the self-routing switch 7b and outputted from the output port #4.

The input end of each of the output line corresponding parts $9_i$ (i=0, ..., 4) is connected to a corresponding one of the output ports #i of the switch element 7, and the output end thereof is connected to a corresponding one of the output transmission lines $11_i$. Each of the output line corresponding parts $9_i$ has a cell buffer 9a and a counter 9b. The ATM cells 15 transmitted via each of the output ports #i (i=0, ..., 4) are temporarily stored in the cell buffer 9a of a corresponding one of the output line corresponding parts $9_i$. The number of the ATM cells 15 stored in the cell buffer 9a is counted by the counter 9b. Then, the readout of the ATM cells 15 from the cell buffer 9a is controlled by the control part 10. The ATM cells 15 read out from the cell buffer 9a of the corresponding one of the output line corresponding parts $9_i$ (i=0, ..., 4) are transmitted to a corresponding one of the output transmission lines $11_i$.

As described above, in the ATM switch in this preferred embodiment, the number of the ATM cells stored in each of the cell buffers is counted by the corresponding counter. In this preferred embodiment, when each of the counters 30 is preset, each of the bit values of the counters 30 is set to be "H", i.e., "1" as shown in FIG. 4. Therefore, when two ATM cells 15 are stored in the cell buffer 20 as shown in FIG. 5(a), each of the bit values of the counters 30 is "0001". In this state, if one ATM cell 15 is inputted to the cell buffer 20, each of the bit values of the counters 30 is "0010" (see FIG. 5(b)). In this state, if one ATM cell 15 is read out from the cell buffer 20, each of the bit values of the counters 30 is "0001" (see FIG. 5(c)). In this state, if one ATM cell 15 is further read out from the cell buffer 20, each of the bit values of the counters 30 is "0000" (see FIG. 5(d)). In this state, if one ATM cell 15 is further read out from the cell buffer 20, each of the bit values of the counters 30 is "1111" (see FIG. 5(e)), which is the same state as the preset state.

In the counters 30 with this construction, it can be determined whether the number of the ATM cells 15 stored in the cell buffer 20 is zero, by detecting whether the most significant bit value is "1" as shown in FIG. 4. Therefore, the construction of the decoder 32 is far simpler than conventional decoders, so that the ATM switch 1 can be more compact than conventional ATM switches.

Furthermore, in this preferred embodiment, each of the counters 30 must have bits which have the number of digits more than a countable value by at least one digit.

In this preferred embodiment, while each of the bit values of the counters has been set to be "H" when all of the counters in the ATM switch 1 are preset, at least one counter may have the above described construction. Also in this case, the ATM switch can be more compact than conventional ATM switches.

Furthermore, in the ATM switch in this preferred embodiment, while the switch element 7 has been the input buffer type switch element wherein the cell buffers are provided on the input side, i.e., in the front stage of the self-routing switch 7b, the switch element 7 may be an output buffer type switch element wherein the cell buffers are provided on the output side, i.e., in the subsequent stage of the self-routing switch 7b. Alternatively, the switch element 7 may be a cross point buffer type switch element wherein the cell buffers are provided at respective cross points in the self-routing switch 7b, or a common buffer type switch element wherein all of the cell buffers are common.

As described above, according to the present invention, the ATM switch can be compact.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An ATM switch comprising:

a plurality of input line corresponding parts, each of which is provided in a corresponding one of input transmission lines, to which ATM cells are transmitted, each of said input line corresponding parts having a used quantity parameter control unit for monitoring the flow rate of the ATM cells, and a header converting part for converting VPI and VCI of a header of each of the ATM cells which have passed through said used quantity parameter control unit;

a switch element having an input port part, which has a plurality of input ports, each of which corresponds to a corresponding one of said input line corresponding parts, and which receives said ATM cells transmitted from said input line corresponding parts via a corresponding one of said input ports, an output port part having a plurality of output ports, a self-routing switch for outputting said ATM cells, which are received via said input ports, from one of said output ports corresponding to the VCI of the header of each of said ATM cells, a first cell buffer for temporarily storing said ATM cells, and a first counter for counting the number of said ATM cells in said first cell buffer; and a plurality of output line corresponding parts provided so as to correspond to said output ports, each of said output line corresponding parts having a second cell buffer for temporarily storing said ATM cells transmitted from a corresponding one of said output ports and for outputting said ATM cells to a corresponding one of output transmission lines, and a second counter for counting the number of said ATM cells in said second cell buffer, wherein said used quantity parameter control unit has a third cell buffer for temporarily storing said ATM cells, and a third counter for counting the number of said ATM cells in said third cell buffer, and wherein each of bit values of at least one of said first through third counters is set to be "H" when said at least one of said first through third counters is preset.

2. An ATM switch as set forth in claim 1, which further comprises a decoder for determining whether said ATM cells exist in a corresponding one of said cell buffers, on the basis of the most significant value of said at least one of said first through third counters, each of the bit values of which is set to be "H" when said at least one of said first through third counters is preset.

3. An ATM switch as set forth in claim 1, which further comprises a control circuit for controlling the readout of said ATM cells from said second and third cell buffers.

4. An ATM switch as set forth in claim 1, wherein said first cell buffer is provided in a front stage of said self-routing switch so as to correspond to each of said input ports.

5. An ATM switch as set forth in claim 1, wherein said first cell buffer is provided in a subsequent stage of said self-routing switch so as to correspond to each of said output ports, and said first counter is provided so as to correspond to each of said cell buffers.

6. An ATM switch as set forth in claim 1, wherein said first cell buffer is provided at each of cross points in said self-routing switch, and said first counter is provided so as to correspond to each of said cell buffers.

7. An ATM switch as set forth in claim 1, wherein said first cell buffer is a common buffer.

8. An ATM switch as set forth in claim 2, which further comprises a control circuit for controlling the readout of said ATM cells from said second and third cell buffers.

9. An ATM switch as set forth in claim 2, wherein said first cell buffer is provided in a front stage of said self-routing switch so as to correspond to each of said input ports.

10. An ATM switch as set forth in claim 2, wherein said first cell buffer is provided in a subsequent stage of said self-routing switch so as to correspond to each of said output ports, and said first counter is provided so as to correspond to each of said cell buffers.

11. An ATM switch as set forth in claim 2, wherein said first cell buffer is provided at each of cross points in said self-routing switch, and said first counter is provided so as to correspond to each of said cell buffers.

12. An ATM switch as set forth in claim 2, wherein said first cell buffer is a common buffer.

13. An ATM switch as set forth in claim 3, wherein said first cell buffer is provided in a front stage of said self-routing switch so as to correspond to each of said input ports.

14. An ATM switch as set forth in claim 3, wherein said first cell buffer is provided in a subsequent stage of said self-routing switch so as to correspond to each of said output ports, and said first counter is provided so as to correspond to each of said cell buffers.

15. An ATM switch as set forth in claim 3, wherein said first cell buffer is provided at each of cross points in said self-routing switch, and said first counter is provided so as to correspond to each of said cell buffers.

16. An ATM switch as set forth in claim 3, wherein said first cell buffer is a common buffer.

* * * * *